(12) United States Patent
Setterberg et al.

(10) Patent No.: US 11,741,745 B2
(45) Date of Patent: Aug. 29, 2023

(54) MULTICOLOR ILLUMINATION IN AN OPTICAL FINGERPRINT SENSOR FOR ANTI-SPOOFING

(71) Applicant: Fingerprint Cards Anacatum IP AB, Gothenburg (SE)

(72) Inventors: Eric Setterberg, Vastra Frölunda (SE); Johan Hammersberg, Floda (SE); Jan Berglund, Gothenburg (SE)

(73) Assignee: Fingerprint Cards Anacatum IP AB, Gothenburg (SE)

( * ) Notice: Subject to any disclaimer, the term of this patent is extended or adjusted under 35 U.S.C. 154(b) by 0 days.

(21) Appl. No.: 17/799,822

(22) PCT Filed: Feb. 16, 2021

(86) PCT No.: PCT/SE2021/050131
§ 371 (c)(1),
(2) Date: Aug. 15, 2022

(87) PCT Pub. No.: WO2021/173056
PCT Pub. Date: Sep. 2, 2021

(65) Prior Publication Data
US 2023/0063482 A1 Mar. 2, 2023

(30) Foreign Application Priority Data

Feb. 28, 2020 (SE) .................... 2050222-5

(51) Int. Cl.
*G06V 40/12* (2022.01)
*G06V 40/13* (2022.01)
*G06V 10/143* (2022.01)

(52) U.S. Cl.
CPC ........ *G06V 40/1394* (2022.01); *G06V 10/143* (2022.01); *G06V 40/1318* (2022.01)

(58) Field of Classification Search
CPC ............. G06V 40/1394; G06V 10/143; G06V 40/1318
See application file for complete search history.

(56) References Cited

U.S. PATENT DOCUMENTS

2017/0220844 A1   8/2017   Jones et al.
2017/0337413 A1   11/2017  Bhat et al.
(Continued)

FOREIGN PATENT DOCUMENTS

EP    2120182 A1    11/2009
WO    2017129126 A1  8/2017

OTHER PUBLICATIONS

PCT International Search Report and Written Opinion for International Application No. PCT/SE2021/050131 dated Mar. 17, 2021, 14 pages.
(Continued)

*Primary Examiner* — Abhishek Sarma
(74) *Attorney, Agent, or Firm* — RMCK Law Group, PLC (57) ABSTRACT

The present invention relates to a method for biometric authentication of a user of an electronic device comprising an optical fingerprint sensor arranged under an at least partially transparent display panel and configured to capture an image of an object located on an opposite side of the transparent display panel, the method comprises the steps of: illuminating the object with light of at least one distinguishable color; capturing at least two images of the object with an image sensor comprising a photodetector pixel array while illuminating the object with the light of at least one distinguishable color, wherein the images are captured for different applied forces by the object on the transparent display panel; and performing biometric authentication at least partly based on at least one relationship between the at least two images, the at least one relationship being related (Continued)

to a difference in pixel intensity from pixels in the photodetector pixel array arranged to detect light of the distinguishable color.

20 Claims, 6 Drawing Sheets

(56) References Cited

U.S. PATENT DOCUMENTS

| | | |
|---|---|---|
| 2019/0026527 A1 | 1/2019 | He et al. |
| 2020/0034597 A1 | 1/2020 | He et al. |
| 2020/0050818 A1 | 2/2020 | He et al. |
| 2021/0271851 A1* | 9/2021 | Chou .................. A61B 5/1172 |

OTHER PUBLICATIONS

Yau, W. et al., "Fake Finger Detection by Finger Color Change Analysis," ICB'07: Proceedings of the 2007 International Conference on Advances in Biometrics, Aug. 2007, pp. 888-896.

Drahansky, M. et al., "Advanced Biometric Technologies, Chapter 9: Liveness Detection in Biometrics," Advanced Biometric Technologies, Inc., Aug. 9, 2001, pp. 179-198.

Drahansky, M. et al., "New Optical Methods for Liveness Detection on Fingers," BioMed Research International, Jan. 2013, pp. 1-11.

Extended European Search Report dated Jun. 7, 2023 for EP Application No. 21759604.8, 7 pages.

\* cited by examiner

MULTICOLOR ILLUMINATION IN AN OPTICAL FINGERPRINT SENSOR FOR ANTI-SPOOFING

CROSS-REFERENCE TO RELATED APPLICATIONS

This application is a 371 U.S. National Stage of International Application No. PCT/SE2021/050131, filed Feb. 16, 2021, which claims priority to Swedish Patent Application No. 2050222-5, filed Feb. 28, 2020. The disclosures of each of the above applications are incorporated herein by reference in their entirety.

FIELD OF THE INVENTION

The present invention relates to a method for biometric authentication a user of an electronic device comprising an optical fingerprint sensor arranged under an at least partially transparent display panel. The invention further relates to an optical fingerprint sensor and to an electronic device comprising an under-display optical fingerprint sensor.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released consumer electronic devices, such as mobile phones.

Optical fingerprint sensors have been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor.

It has recently been of interest to arrange optical fingerprint sensors under the display of electronic devices. However, it turns out that optical fingerprint sensors arranged under displays are sometimes relatively easy to spoof. In some cases, if countermeasures are not applied a piece of paper with a printed fingerprint on it has proven enough to spoof the system.

Accordingly, there is a need for improving the reliability of the spoof detection methodology of under display solution for optical fingerprint sensors.

SUMMARY

In view of above-mentioned and other drawbacks of the prior art, it is an object of the present invention to provide a method for biometric authentication using an under display optical fingerprint sensor with improved biometric security. In particular, the inventive concept provides for improved capability to prevent spoofs from breaching the biometric protection.

According to a first aspect of the invention, there is provided a method for biometric authentication of a user of an electronic device comprising an optical fingerprint sensor arranged under an at least partially transparent display panel and configured to capture an image of an object located on an opposite side of the transparent display panel.

The method comprises the steps: illuminating the object with light of at least one distinguishable color; capturing at least two images of the object with an image sensor comprising a photodetector pixel array while illuminating the object with the light of at least one distinguishable color, wherein the images are captured for different applied forces by the object on the transparent display panel; and performing biometric authentication at least partly based on at least one relationship between the at least two images related to a difference in pixel intensity from pixels in the photodetector pixel array arranged to detect light of the distinguishable color.

The present invention is based on the realization that live fingers exhibit a pressure-dependent color response. This means that if a live finger located on the opposite side of a transparent display panel opposite from the light source and image sensor, is illuminated with light of a known distinguishable color, the spectral information in the reflected light captured by the image sensor in an image depends on the pressure the finger applied on the display panel when the image was acquired.

Generally, the color of a portion of a living being changes when a pressure is applied on the portion. The color change is due to that blood is forced out of the capillaries by the applied pressure, whereby the color of the portion, such as a finger, changes.

In contrast, a spoof, not made from live material, does not have capillaries and therefore does not exhibit the same color change in response to an applied pressure. The light reflected from a spoof is independent of color and pressure, i.e. the color response is often "flat". For example, with a typical spoof, the amount of blue light reflected is equal to the amount of red light reflected, regardless of the pressure applied by the spoof.

The inventors thus realized to take advantage of this knowledge, and thus provide a method in which biometric authentication is based at least partly on analyzing relationships between images acquired for different applied forces while illuminating the object with light of a distinguishable color. Further, also the forces applied while capturing the images may be used in the analysis, for some embodiments.

Light of a distinguishable color is meant to be light that has spectral band that is a sub-band of the visible wavelength range of light, i.e. light of a distinguishable color is not white light which generally is a mix of all colors. As should be understood, light of a distinguishable color should be separately detectable from light of another distinguishable color.

The relationship is based on differences in pixel intensity between the two images, for pixels arranged to detect light of the distinguishable color. In other words, the pixel intensity from pixels arranged to detect light of the distinguishable color in a first image is compared to the pixel intensity from pixels arranged to detect light of the distinguishable color in a second image. The pixels of the two images may be the same pixels in the array or they may be different pixels depending on the specific implementation as will be described with reference to specific embodiments.

The pixels arranged to detect light of a distinguishable color may be arranged near a source used for illuminating the object with the distinguishable color such that the pixel primarily receives light emitted from the source and that was reflected off the object. Many such configurations are conceivable, in one possible implementation the source is arranged vertically above the pixel.

Advantageously, the object may be illuminated with light of at least two distinguishable colors, wherein the captured images comprise images at the different applied forces for each of the at least two distinguishable colors, wherein the at least one relationship comprises, for each of the at least two distinguishable colors, a difference in pixel intensity from pixels arranged to detect light of the respective distinguishable color.

In other words, a first relationship may be a difference in pixel intensity for a first distinguishable color, and a second relationship may be a difference in pixel intensity for a second distinguishable color, and so on. Thus, even if a spoof manages to mimic the difference in pixel intensity for a first distinguishable color, it also has to simultaneously mimic the difference in pixel intensity for a second distinguishable color. Hence, further enhanced biometric security is provided with this embodiment.

The object may be illuminated with light of at least two distinguishable colors in at least two different ways, by spatially separated light sources that illuminates the object simultaneously or by sequentially illuminating the object with light of the different distinguishable colors.

In one embodiment, the object may be simultaneously illuminated with light of the at least two distinguishable colors from spatially separated illumination zones. For this, separate light sources are used for each of the at least two distinguishable colors. In possible implementations, the illumination of the object may have a known pattern, such as a dot-pattern, concentric circles, different sectors, etc., thereby providing for spatially separate illumination zones.

In one embodiment, the at least two images may be sub-images of a captured image, wherein the different applied forces are caused by a spatial variation of the applied force by the object on the transparent display panel when the sub-images are being captured. The sub-images are simultaneously captured. A captured image generally comprises a set of sub-images, wherein biometric authentication may at least partly be based on at least one relationship between at least two sub-images related to a difference in pixel intensity from pixels in the photodetector pixel array arranged to detect light of the distinguishable color. The pixel intensities are acquired from pixels in the different sub-images.

In other embodiments, the at least two images may be sequentially captured images, wherein the different applied forces are temporally separated. Thus, a first image is captured while a first force is applied by the object, and subsequently, a second image is captured while a second force is applied by the object. Temporally separated applied forces may be considered consecutively applied forces, that are applied without removing the object from the display panel surface. For example, the images may be captured during the act of pushing the finger downwards towards the transparent display panel.

When the object is illuminated with light of at least two distinguishable colors, the at least one relationship may comprise a difference between a first ratio being a ratio between pixel intensities detected for two different distinguishable colors at a first force, and a second ratio being a ratio between pixel intensities detected for the two different distinguishable colors at a second force.

Preferably, at least two images are captured at different applied forces for each of the at least two distinguishable colors.

Still further, when the object is illuminated with light of at least two distinguishable colors, the at least one relationship may comprise a difference between ratios of emitted light intensity of two colors to ratios of pixels intensities for detected light of two colors.

In embodiments, the method may comprise estimating the applied forces, wherein the at least one relationship comprises a relationship between the estimated forces related to different captured images. This dual-relationship provides an additional level of security since the biometric authentication is based on two relationships, one between the estimated applied forces and one between the captured images. Both these relationships should match or at least substantially match those of known relationships for live material.

Estimating the force may be performed in various ways such as by image analysis e.g. studying deformations in the fingerprint, by a sensor in a touch screen, or by a separate force sensor e.g. including resistive or optical sensing means known per se in the art.

The at least one relationship may for example comprise a difference in applied force between two images, and a difference in pixel intensity at at least one distinguishable color between the two images.

For example, if a difference in applied force is first estimated, then it could be estimated what the difference in pixel intensity should be for a live material. Alternatively, predetermined difference in pixel intensity for given force differences could be stored. The measured variation in color intensity is then compared to the predetermined, or estimated, variation in color intensity that corresponds to the determined difference in applied force. If a match is found, then the object may be assumed to consist of live material with high probability.

The light illuminating the object may be provided a separate light source dedicated for the optical fingerprint sensor.

However, in preferred embodiments, the light of at least one or two distinguishable colors is provided by a color controllable light source comprised in the electronic device.

The spectral bands of the light of distinguishable colors is at least partly separated. Thus, some overlap between the spectral bands may be allowable. The spectral bands may preferably span a wavelength range that is substantially within a single-color band.

The spectral bands include at least one of blue light, and red light, and green light. In the case of multiple distinguishable colors, more than one of blue light, red light, and green light is included.

According to a second aspect of the invention, there is provided an optical fingerprint imaging arrangement configured to be arranged under an at least partially transparent display panel and configured to capture an image of an object located on an opposite side of the transparent display panel, the optical fingerprint imaging arrangement comprising: an image sensor comprising a photodetector pixel array; wherein the optical fingerprint imaging arrangement is configured to: capture at least two images of the object while the object is illuminated with light of at least one distinguishable color by a color controllable light source, wherein the images are captured for different applied forces by the object on the transparent display panel; and wherein biometric authentication is performed at least partly based on at least one relationship between the at least two images, the relationship being related to a difference in pixel intensity from pixels in the photodetector pixel array arranged to detect light of the distinguishable color.

By means of the claimed invention, an optical fingerprint imaging arrangement is provided which is readily integrated in a display panel to provide in-display fingerprint sensing functionality, and where the spoof detection capability is improved.

The outer surface of a display panel under which the optical fingerprint imaging arrangement is arranged may also be referred to as a sensing surface.

The operating principle of the described optical fingerprint imaging arrangement is that light emitted by pixels in the display panel will be reflected by a finger placed on the sensing surface, and the reflected light may be received by light redirecting elements and subsequently redirected onto a corresponding subarray of pixels in the photodetector pixel array. In case of a subarray, an image of a portion of a finger can be captured for each subarray.

By combining the images from all the light redirecting elements, an image representing the fingerprint can be formed and subsequent biometric verification can be performed. For liveness verification, the object, e.g. a finger, is additionally illuminated with light of at least one distinguishable color. This light is also reflected by the finger and redirected to a corresponding subarray of pixels. The images captured by the subarrays and the corresponding forces applied by the object may be analyzed according to embodiments of the invention as part of the biometric authentication procedure.

In embodiments, the color controllable light source may be controllable to illuminate the object with light of at least two distinguishable colors, wherein the captured images comprise images at the different applied forces for each of the at least two distinguishable colors, wherein the at least one relationship comprises, for each of the at least two distinguishable colors, a difference in pixel intensity from pixels arranged to detect light of the respective distinguishable color.

In embodiments, wherein the color controllable light source may be controllable to simultaneously illuminate the object with light of at least two distinguishable colors from spatially separate illumination zones of the color controllable light source.

In embodiments, the at least two images may be sub-images of a captured image, wherein the different applied forces are a spatial variation of the applied force by the object on the transparent display panel when the sub-images are being captured.

In embodiments, the color controllable light source may be controllable to sequentially illuminate the object with light of the at least two distinguishable colors, wherein at least one image is captured while illuminating the object with light of each of the at least two distinguishable colors.

The optical fingerprint imaging arrangement may be configured to estimate the applied forces based on the captured images. Accordingly, the applied force may be estimated by image processing, for example of the deformation of the friction ridge pattern of a fingerprint. Further, the force estimation may in some implementations be provided by a touch screen having such capabilities already included. Still further, the force estimation may in some implementations be provided by auxiliary force sensors provided in the device where the optical fingerprint imaging arrangement is arranged.

In other embodiments, the optical fingerprint imaging arrangement may comprise a force sensor for measuring the applied forces.

The color controllable light source preferably comprises a set of color controllable light units arranged in an array.

According to embodiments, the color controllable light source and the image sensor may be arranged such that the pixels in the photodetector pixel array that are arranged to detect light of the distinguishable color primarily receives light emitted by color controllable light units configured to emit light of the distinguishable color. In this way, the intensity measured by predetermined pixels for a certain distinguishable color may be acquired for performing the biometric authentication.

In one embodiment, the pixels in the photodetector pixel array arranged to detect light of the distinguishable color may be arranged directly under the color controllable light units configured to emit light of the distinguishable color. The spatial relationship between the pixels and the corresponding color controllable light units may be vertical displacement, in other words, the pixel is disposed directly vertically below the color controllable light unit emitting light of the distinguishable color.

In some embodiments, the color controllable light source may be included in a display. Various types of displays can be used in accordance with embodiments. For example, display panels based on OLED, u-LED with any type of tri-stimulus emission like RGB, CMY or others.

The image sensor may be any suitable type of image sensor, such as a CMOS or CCD sensor connected to associated control circuitry. In one possible implementation the image sensor is a thin-film transistor (TFT) based image sensor which provides a cost-efficient solution for under display fingerprint imaging sensors. The operation and control of such image sensors can be assumed to be known and will not be discussed herein. The TFT image sensor may be a back illuminated TFT image sensor or a front illuminated TFT image sensor. The TFT image sensor may be arranged as a Hot-zone, Large Area or Full display solution.

The optical fingerprint sensing arrangement may comprise an array a light redirecting element configured to redirect light onto a subarray of pixels in the photodetector pixel array.

The array of light redirecting elements may be an array of microlenses. Microlenses provide an advantageous way to redirect light onto the photodetector pixel array. In particular, each is microlens may be arranged to redirect light onto a subarray of pixels.

The array of microlenses may be arranged on a transparent substrate arranged to cover the image sensor. This simplifies the manufacturing of the biometric imaging device since the microlenses may all be manufactured on the same transparent substrate. Further, having all the microlenses arranged on a single substrate facility the task of getting the microlenses in a single plane. An opaque layer arranged to cover an upper surface of the transparent substrate. The opaque layer further comprises a plurality of separate openings, wherein each of the microlenses is located in a respective opening in the opaque layer. This advantageously ensures that limited stray light is detected by the image sensor, i.e. it prevents light reaching the image sensor that has not passed thought a microlens.

The microlenses may be arranged in an array having a pitch in the range of 50 μm to 2 mm.

The microlenses may be circular lenses having a diameter in the range of 20 μm to 1 mm.

The microlenses may be rectangular lenses having a length of a shortest side in the range of 20 μm to 1 mm.

Moreover, the microlens may have a height in the range of 2 μm to 600 μm.

With the above described possible configurations of the plurality of microlenses, an optical fingerprint senor for use under a display panel can be provided, and the specific configuration can be adapted based on the properties of the display panel and on the requirements for the application at hand.

Further effects and features of the second aspect of the invention are largely analogous to those described above in connection with the first aspect of the invention.

According to a third aspect of the invention, there is provided an electronic device comprising: a transparent display panel; the optical fingerprint imaging arrangement according to any one herein described embodiments, and processing circuitry configured to: receive a signal from the optical fingerprint imaging arrangement indicative of a fingerprint of a finger touching the transparent display panel, perform a fingerprint authentication procedure based on the detected fingerprint.

The electronic device may be e.g. a mobile device such as a mobile phone (e.g. Smart Phone), a tablet, a phablet, etc.

Further effects and features of the third aspect of the invention are largely analogous to those described above in connection with the first aspect and the second aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

In the present detailed description, various embodiments of the optical fingerprint imaging arrangement according to the present invention are mainly described with reference to an optical fingerprint imaging arrangement arranged under a display panel. However, it should be noted that the described imaging device also may be used in other optical fingerprint imaging applications such as in an optical fingerprint sensor located under a cover glass or the like.

Figure 1:
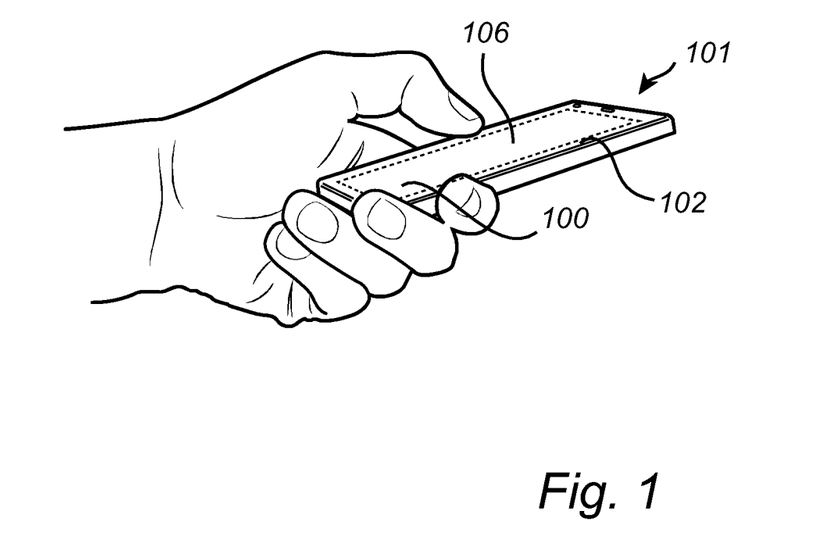
FIG. 1 schematically illustrates an example of an electronic device according to embodiments of the invention.

Turning now to the drawings and in particular to FIG. 1, there is schematically illustrated an example of an electronic device configured to apply the concept according to the present disclosure, in the form of a mobile device 101 with an integrated in-display optical fingerprint imaging arrangement 100 and a display panel 102 with a touch screen interface 106. The optical fingerprint imaging arrangement 100 may, for example, be used for unlocking the mobile device 100 and/or for authorizing transactions carried out using the mobile device 100, etc.

The optical fingerprint imaging arrangement 100 is here shown to be smaller than the display panel 102, but still relatively large, e.g. a large area implementation. In another advantageous implementation the optical fingerprint imaging arrangement 100 may be the same size as the display panel 102, i.e. a full display solution. Thus, in such case the user may place his/her finger anywhere on the display panel for biometric authentication. The optical fingerprint imaging arrangement 100 may in other possible implementations be smaller than the depicted optical fingerprint imaging arrangement, such as providing a hot-zone implementation.

Preferably and as is apparent for the skilled person, the mobile device 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to any other type of electronic devices comprising transparent display panels, such as a laptop, a tablet computer, etc.

Figure 2:
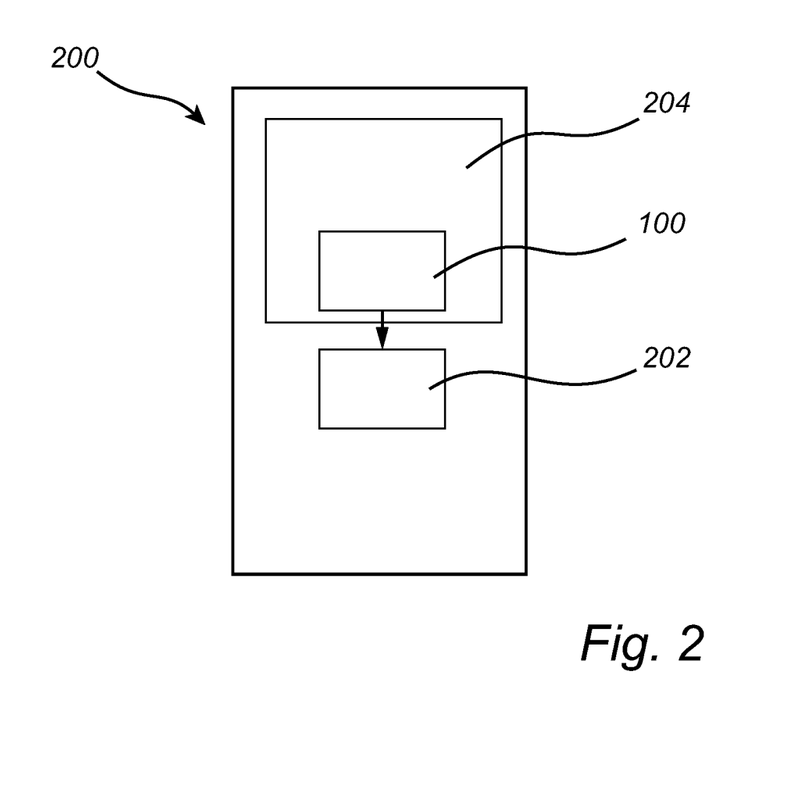
FIG. 2 is a schematic box diagram of an electronic device according to embodiments of the invention.

FIG. 2 is a schematic box diagram of an electronic device according to embodiments of the invention. The electronic device 200 comprises a transparent display panel 204 and an optical fingerprint imaging arrangement 100 conceptually illustrated to be arranged under the transparent display panel 204 according to embodiments of the invention. Furthermore, the electronic device 200 comprises processing circuitry such as control unit 202. The control unit 202 may be stand-alone control unit of the electronic device 202, e.g. a device controller. Alternatively, the control unit 202 may be comprised in the optical fingerprint imaging arrangement 100.

The control unit 202 is configured to receive a signal indicative of a detected object from the optical fingerprint imaging arrangement 100. The received signal may comprise image data.

Based on the received signal the control unit 202 is arranged to detect a fingerprint, and based on the detected fingerprint the control unit 202 is configured to perform a fingerprint authentication procedure. Such fingerprint authentication procedures are considered per se known to the skilled person and will not be described further herein.

Figure 3:
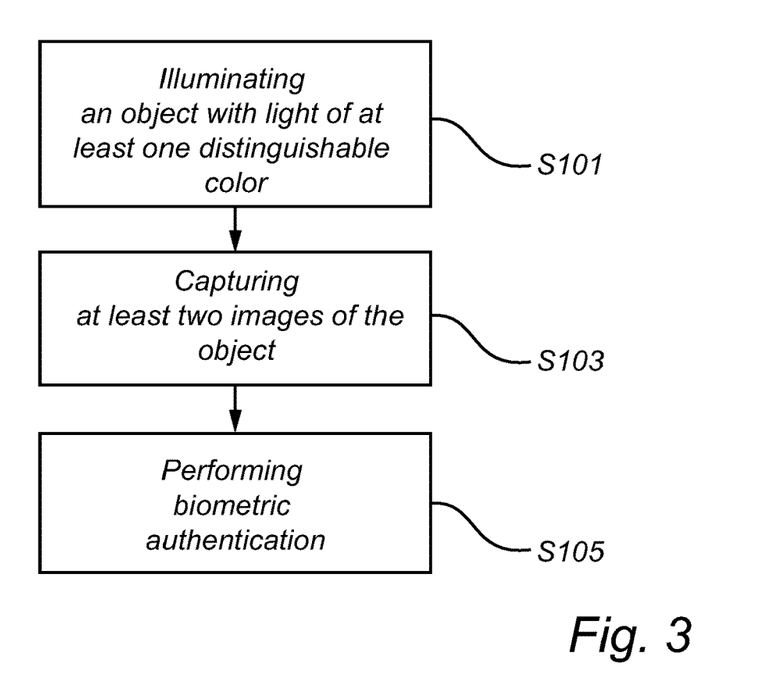
FIG. 3 is a flow-chart of method steps according to embodiments of the invention.

FIG. 3 is a flow chart of method steps according to embodiments of the invention for biometric authenticating a user of an electronic device comprising an optical fingerprint sensor arranged under an at least partially transparent display panel. The optical fingerprint sensor is configured to capture an image of an object located on an opposite side of the transparent display panel.

The method comprises a first step S101 of illuminating an object with light of at least one distinguishable color.

In step S103, capturing at least two images of the object with an image sensor comprising a photodetector pixel array while illuminating the object with the light of at least one distinguishable color. The images are captured for respective different applied forces by the object on the transparent display panel.

In step S105, performing biometric authentication at least partly based on at least one relationship between the at least two images related to a difference in pixel intensity from pixels in the photodetector pixel array arranged to detect light of the distinguishable color.

Figure 4:
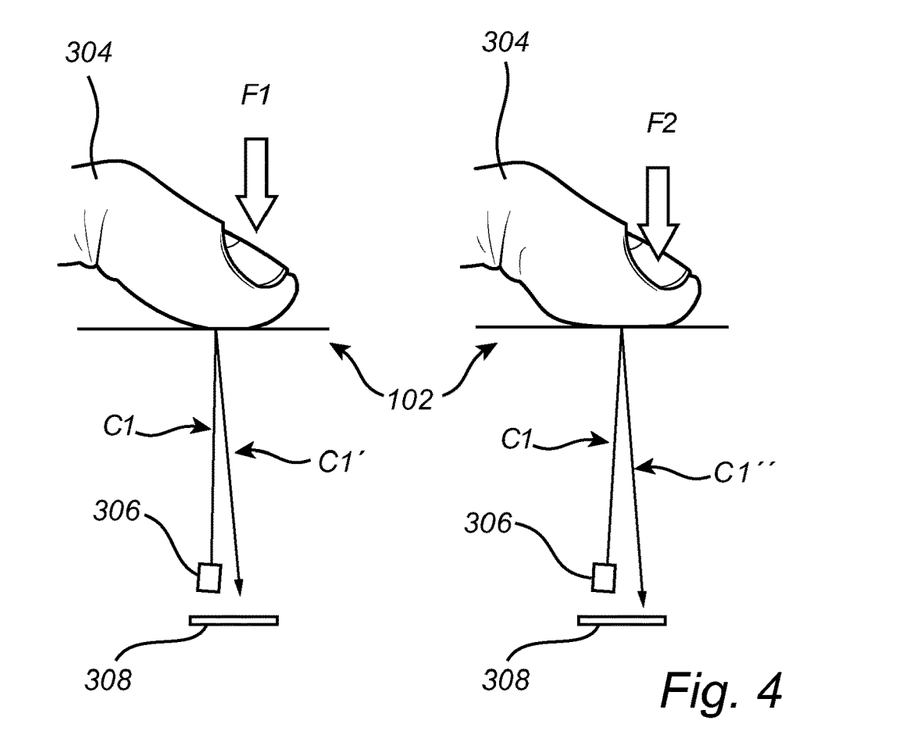
FIG. 4 schematically illustrates the inventive concept for embodiments of the invention.

FIG. 4 schematically illustrates the general inventive concept. An object here illustrated as a finger 304 applies a force F1 onto an at least partly transparent display panel 102 while a light source 306 illuminates the finger 304 with light of distinguishable color C1. Subsequently, the finger applies force F2, while the light source 306 illuminates the finger 304 with light of the same distinguishable color C1.

An image sensor 308 captures two images of the finger 304 while illuminating the object with light of color C1. Accordingly, the images are sequentially captured when the finger applies forces F1 and subsequently F2 on the transparent display panel 102. Preferably, F2 is larger than F1, which means that the images are preferably captured during the finger push down motion and thus before the finger release motion.

In some embodiments, the forces F1 and F2 are optionally estimated for example by image processing, e.g. analyzing deformation of the finger's 304 fingerprint in the images, or the forces may be measured by a force sensor.

The reflected light C1' from the finger at force F1 is not equal to the reflected light C1'' from the finger at force F2 due to effects described herein. Thus, image captured at force F1 will capture the color response C1' and the image captured at force F2 will capture the color response C1''. Despite the same illumination C1, the response from a live finger 304 will depend on the applied force F1, F2. This means that if the applied forces F1 and F2 are different, the color responses C1' and C1'' will also be different. This was realized by the inventors who understood to use this force dependent color response for determining the liveness of an object.

To this end, biometric authentication is at least partly based on at least one relationship between the at least two images, related to a difference in pixel intensity from pixels in the photodetector pixel array arranged to detect light of the distinguishable color. Accordingly, the pixel intensity of pixels arranged to detect the light of distinguishable color C1 are arranged to detect the reflected light C1' and C1'' and therefore capture the color responses caused by the applied forces. The detected intensity of the reflected light, e.g. C1' and C1'' are considered the color response from the object at different forces, for a distinguishable color C1. The difference in pixel intensity between the pixels in one image capturing the reflected light C1' and the pixels in another image capturing the light reflected C1'' is used for biometric authentication.

The illustrated process in FIG. 4 is based on that the two images, capturing C1' and C1'' are sequentially captured images, wherein the different applied forces F1 and F2 are temporally separated, e.g. consecutively applied forces.

In other possible implementations, the images are sub-images of a captured image, i.e. of a single captured image. In such case, the different applied forces may be a result of a spatial variation of the applied force by the object on the transparent display panel when the sub-images are being captured. This will now be conceptually described with reference to FIG. 5.

Figure 5:
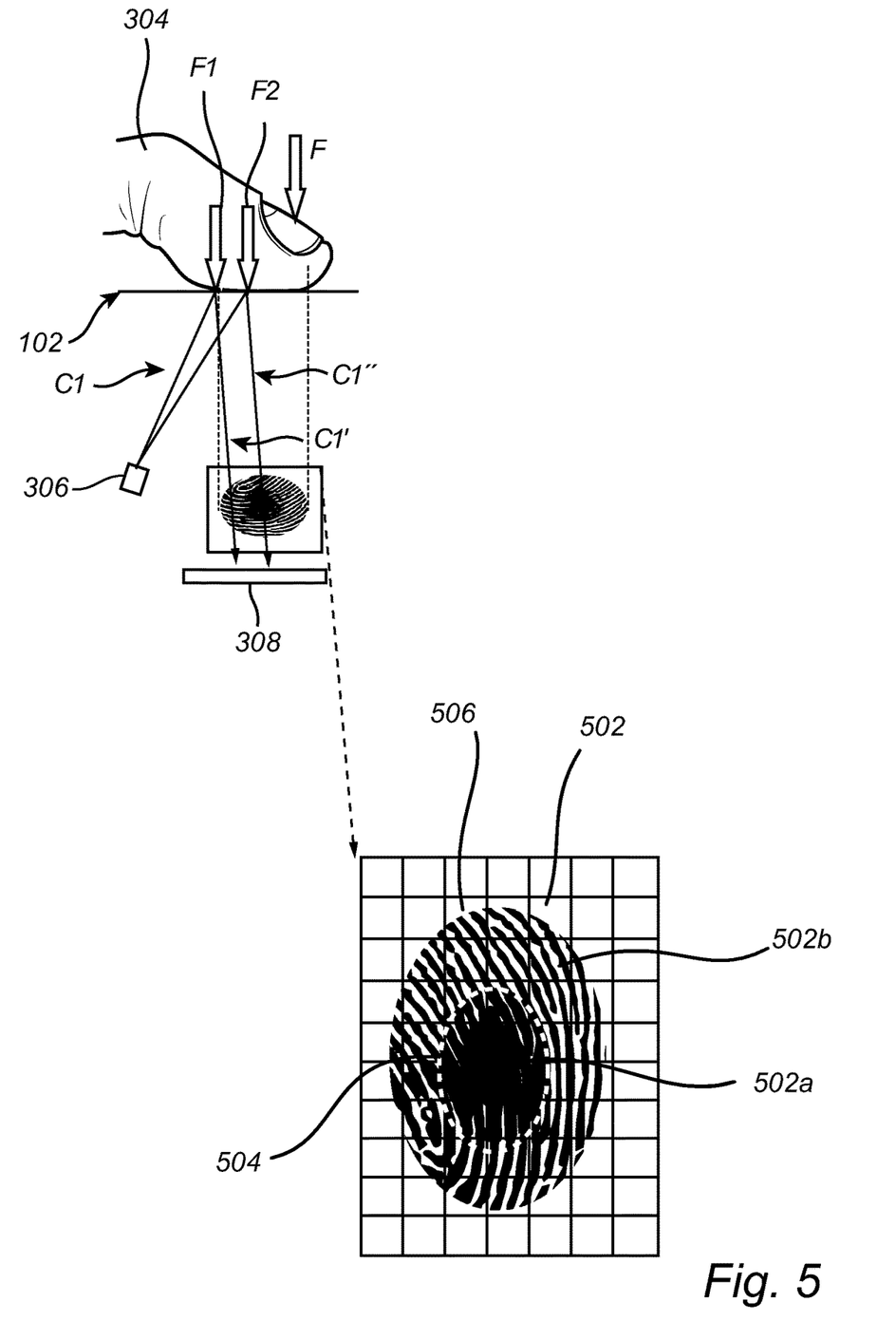
FIG. 5 schematically illustrates the inventive concept for embodiments of the invention.

FIG. 5 illustrates, in a similar manner to FIG. 4, a finger 304 as it applies a force F on a display panel 102 while a light source 306 illuminates the finger 304 with light of distinguishable color C1. The image sensor 308 captures multiple sub-images 502, of which two are denoted 502a-b. The sub-images 502a and 502b are captured for different applied forces by the finger 304 on the display panel 102.

When the finger applies the force F on the display panel 102, the force is spatially distributed on the display panel 102. In one portion 504, often in the center of the finger-display contact interface, the force is higher than in more peripheral portions 506 due to the shape and softness of the finger which results in a closer contact in the center portion than in the outer peripheral portions.

Accordingly, a first sub-image 502a may be related to a portion of the fingerprint where a higher force, e.g. F2 is applied on the display panel, than the force F1 applied in an area of the fingerprint at a second sub-image 502b in more peripheral portions of the contact interface between the finger 304 or object and the display panel 102. The different forces for the different sub-images results in a similar color response as discussed with reference to FIG. 4 describing sequentially captured images.

Accordingly, the reflected light C1' from the finger portion applying force F2 is not equal to the reflected light C1'' from the finger portion applying force F1. Thus, sub-image 502a captured for force F2 will capture the color response C1'' and the sub-image 502b captured at force F1 will capture the color response C1'. Accordingly, despite the same illumination C1, the response from different portions of a live finger 304 will depend on the spatial distribution of the applied force F1, here resulting in exemplary shown forces F2 and F1. This means that if the applied forces F2 and F1 are different, the color responses C1'' and C1' will also be different, in a similar manner as with the sequentially captured images described in FIG. 4.

The biometric authentication is based on analyzing the difference between the color responses, i.e. the difference between the captured light C1' and the captured light C1'' with reference to the above described embodiments. This difference is a difference in pixel intensity from pixels in the photodetector pixel array arranged to detect light of the distinguishable color. In other words, some pixels are arranged to measure the light C1' and some pixels are arranged to measure the light C1''. The pixels can be same for both C1' and C1'', especially for the sequential case described in FIG. 4.

By summing the signals indicative of the pixel intensities for C1' and separately summing the signals indicative of the pixel intensities for C1'', a difference between the total pixel intensity for C1' and the total pixel intensity for C1'' can be calculated. Depending on the value of this difference, authentication is successful or fails.

For example, for a spoof, the difference between the total pixel intensity for C1' and the total pixel intensity for C1'' is small, and theoretically zero if it is assumed that the color response is independent of force. At least, due to the lack of blood and blood capillaries, it can be understood that the difference is distinguishable from that determined for a live finger.

The difference between pixel intensities may for example be compared to a threshold value for spoof detection. If the difference between pixel intensities falls below a threshold, the biometric authentication may fail, whereas if the difference between pixel intensities exceed the threshold, the biometric authentication may result in successful authentication of the user.

The difference between pixel values may relate to a subtraction between pixel intensities or to a ratio between the pixel intensities, although other ways of comparing the pixel intensities are also conceivable.

As is understood from the above, the values of the applied forces are not strictly required for biometric authentication. It is enough that the applied forces are different. However, in some embodiments, the force difference is utilized.

Accordingly, in some embodiments, the at least one relationship for biometric authentication comprises a difference in applied force between two images, and a difference in color intensity at least one distinguishable color between the two images.

Figure 6:
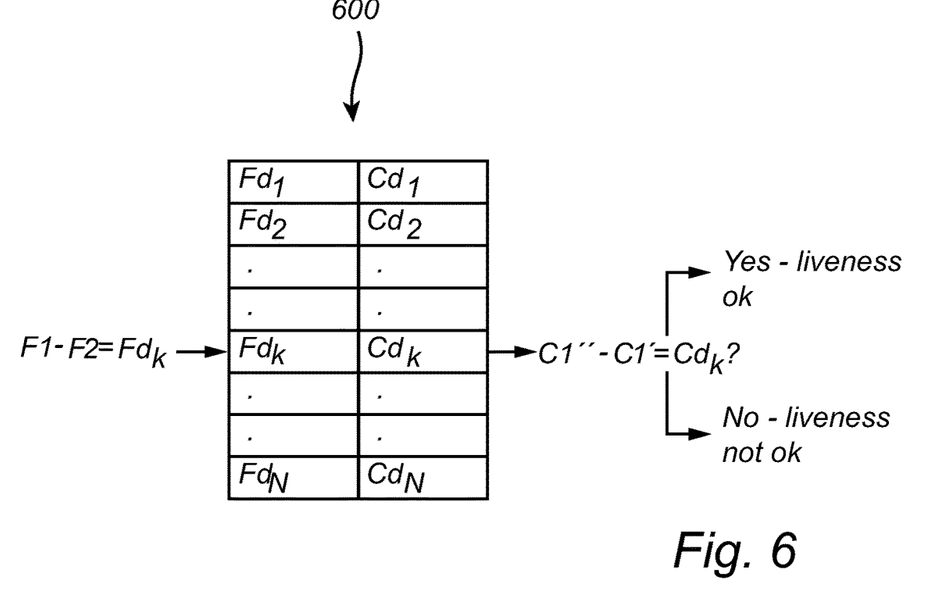
FIG. 6 conceptually illustrates an example relationship scheme for embodiments of the invention.

FIG. 6 conceptually illustrates an example relationship scheme that may be used in accordance with embodiments of the disclosure, and that is based on the example shown in FIGS. 4 and 5. In this example, a difference in applied force $Fd_k$ is determined. The difference is between the forces applied when two images are acquired, in the above examples, the difference is F2-F1. Note that a ratio between forces may equally well be used a difference between forces.

Once the difference $Fd_k$ is determined, the expected difference $Cd_k$ in color response is determined based on the force difference $Cd_k$ and a model 600. The difference in color response is a difference in pixel intensity from pixels in the photodetector pixel array arranged to detect light of the distinguishable color between the two images. As described above, the difference is here a subtraction but may equally well be a ratio.

C1' and C1" represents the response resulting from light of the distinguishable color C1 being reflected and therefore having interacted with the object, i.e. the finger 304.

The expected difference in pixel intensity $Cd_k$ can be estimated, calculated, or empirically determined and stored in a look-up table. Generally, the expected difference in color response $Cd_k$ is found from a model 600.

Once the expected difference in pixel intensity $Cd_k$ is determined based on the force difference $Fd_k$, it is compared to the difference in pixel intensity C1"-C1' as determined from the two captured images. If a match is found the object may be determined to be a live finger with some acceptable probability. If a match is not found, authentication fails.

The expected difference in pixel intensity $Cd_k$ may be provided as an interval, and not necessarily a single number. Then, if the difference in pixel intensity C1"-C1' falls within the color response range $Cd_k$, authentication is successful, if difference in pixel intensity C1"-C1' falls outside the color response range $Cd_k$, authentication fails.

The expected difference in pixel intensity $Cd_k$ may be provided as a threshold. In such case, if the difference in pixel intensity C1"-C1' exceeds the threshold, then authentication may be successful.

It should further be understood that the concept exemplified in FIG. 6 may be performed in the opposite way. In other words, the difference in pixel intensity C1"-C1' may be determined first, whereby an expected force difference is determined from the model 600.

The force differences $Fd_n$ and the differences in pixel intensity $Cd_n$ may be provided as a global model applicable to multiple users. The model 600 may be a local model for a single user. In such case, multiple forces differences $Fd_n$ and respective pixel intensities $Cd_n$ are stored during enrollment of the user.

Figure 7:
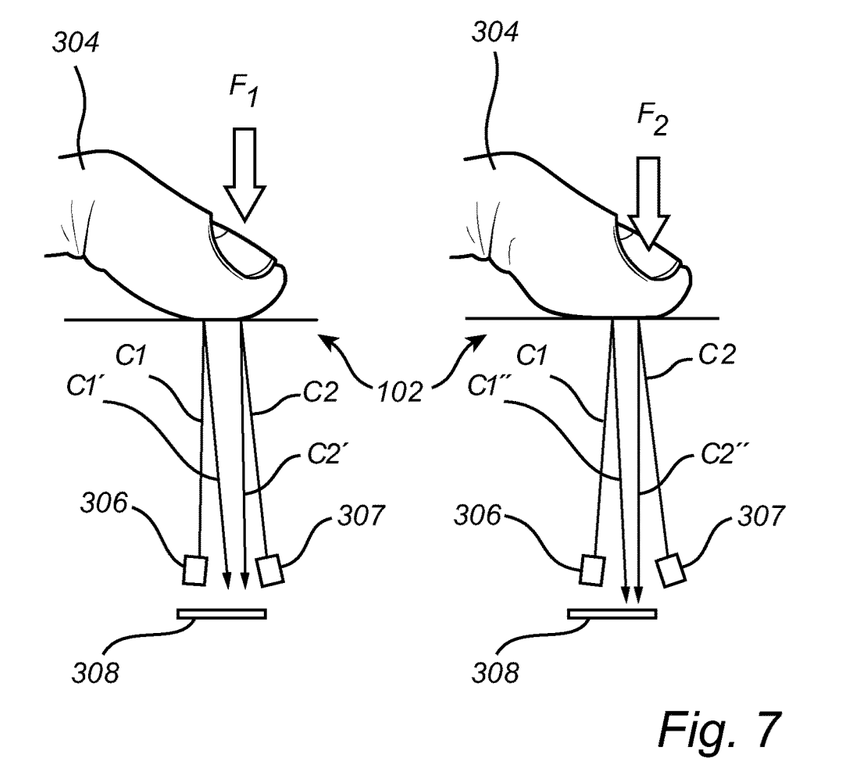
FIG. 7 schematically illustrates the inventive concept for embodiments of the invention.

FIG. 7 conceptually illustrates embodiments of the invention. Here, instead of illuminating the object 304 with light of one distinguishable color, the object is illuminated with light of two distinguishable colors C1 and C2. the captured images comprise images at the different applied forces for each of the at least two distinguishable colors C1 and C2. In this case, the at least one relationship comprises, for each of the at least two distinguishable colors C1 and C2, a difference in pixel intensity from pixels arranged to detect light of the respective distinguishable color.

The difference with the concept described with reference to FIG. 4 is that the image sensor 308 captures two images of the finger 304 while illuminating the object with light of color C1 and C2 instead of only while illuminating the object with light C1. Thus, an image captured at force F1 will capture the color responses C1' and C2' and the image captured at force F2 will capture the color responses C1" and C2".

The object may be simultaneously illuminated with light of the at least two distinguishable colors, e.g. C1 and C2, from spatially separated illumination zones, e.g. light sources 306 and 307. Alternatively, the object 304 is sequentially illuminated with light of the at least two distinguishable colors e.g. C1 and C2.

The biometric authentication procedure with light of the at least two distinguishable colors is analogous to when using a single distinguishable color, with the difference that multiple colors are separately considered.

The relationship used in the biometric authentication may be established in various ways. In one embodiment, when the object is illuminated with light of at least two distinguishable colors, the at least one relationship comprises a difference between a first ratio of pixel intensities detected for two different distinguishable colors at a first force and a second ratio of pixel intensities detected for the two different distinguishable colors at a second force.

In other words, based on the example shown in FIG. 5 or 7, C1'/C2' may be compared with C1"/C2" by determining a difference therebetween.

Figure 8:
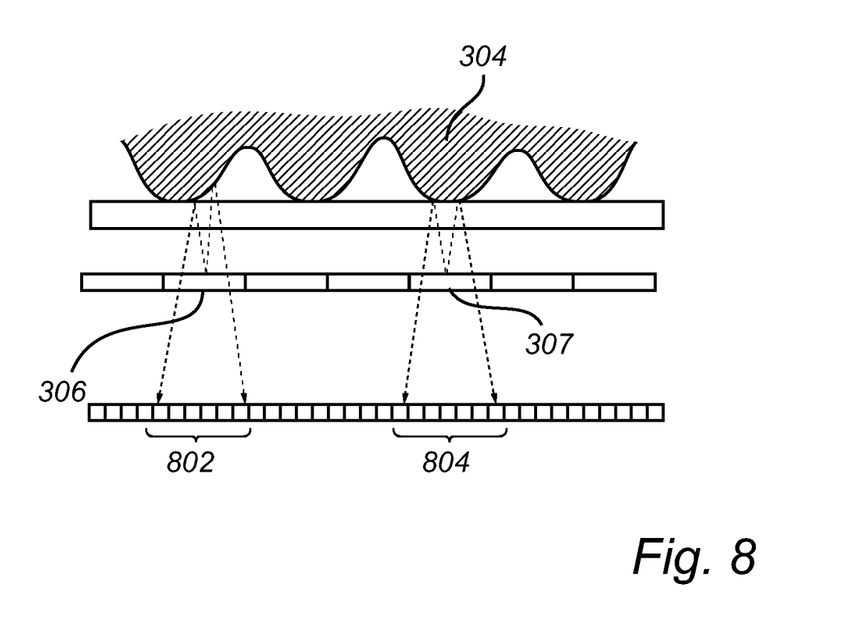
FIG. 8 conceptually illustrates an example arrangement of a color controllable light source and a photodetector pixel array.

Turning to FIG. 8, conceptually illustrating light sources 306 and 307 configured to emit light of a respective distinguishable color, and respective sets of pixels 802 and 804 in the photodetector pixel array arranged to detect light of the distinguishable colors. The pixels 802 are arranged to detect light of the distinguishable color emitted by light source 306 and the pixels 804 are arranged to detect light of the distinguishable color emitted by light source 307. For this, the pixels 802 are arranged vertically below the light source 306 and the pixels 804 are arranged vertically below the light source 307.

It should be understood that more than two distinguishable colors may be used, for example three different distinguishable colors, e.g. red, green, and blue. Preferably, the spectral bands of the light of distinguishable colors is at least partly separated.

Figure 9:
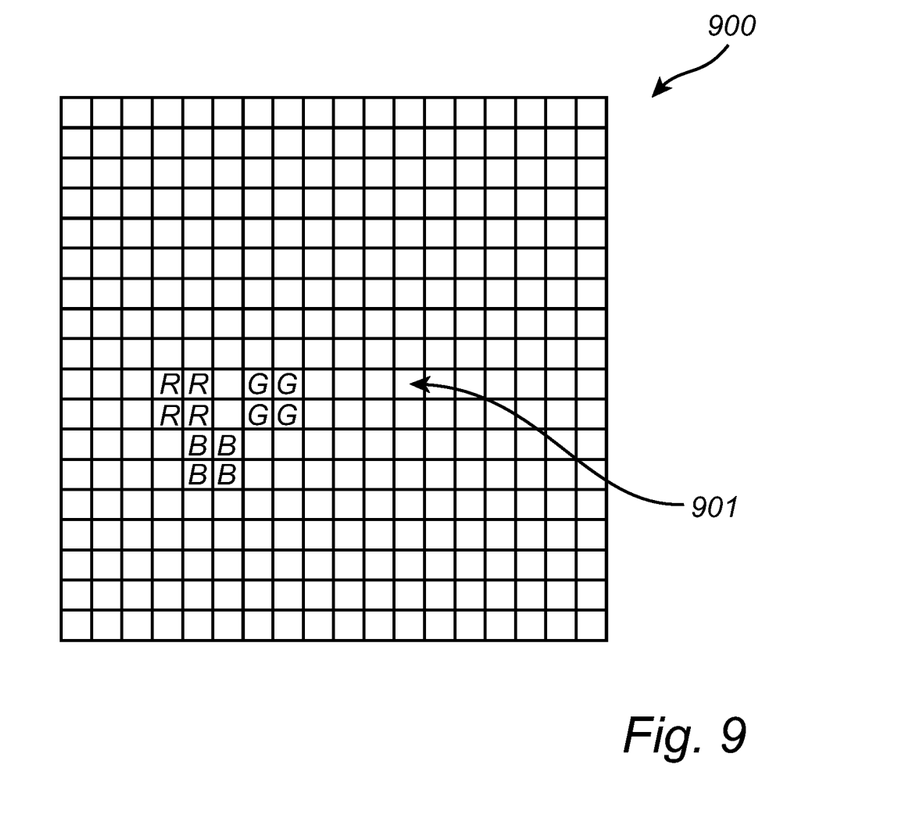
FIG. 9 conceptually illustrates an example color controllable light source having spatially separated illumination zones.

FIG. 9 conceptually illustrates a color controllable light source 900 comprised in an electronic device. The color controllable light source 900 comprises individually controllable light emitting units, e.g. pixels, of which one is denoted 901. The pixels may provide e.g. red, green, and blue light. The color controllable light source 900 may be included in a display. Various types of displays can be used in accordance with embodiments. For example, display panels based on OLED, u-LED with any type of tri-stimulus emission like RGB, CMY or others.

FIG. 9 further conceptually illustrates three spatially separated illumination zones with pixels denoted R, G, and B, corresponding to a red zone (R), and green zone (G), and a blue zone (B) that may be used to provide the spatially separated illumination.

For the biometric authentication procedure, the color responses at each of R, G, and B may be considered directly. However, in such case some function should be used to normalize the responses. For example, normalization using one of the three components (R, G, B). However, more advanced notions could be used, such as considering the HIS color-space and analyze changes in saturation and/or Hue.

Figure 10:
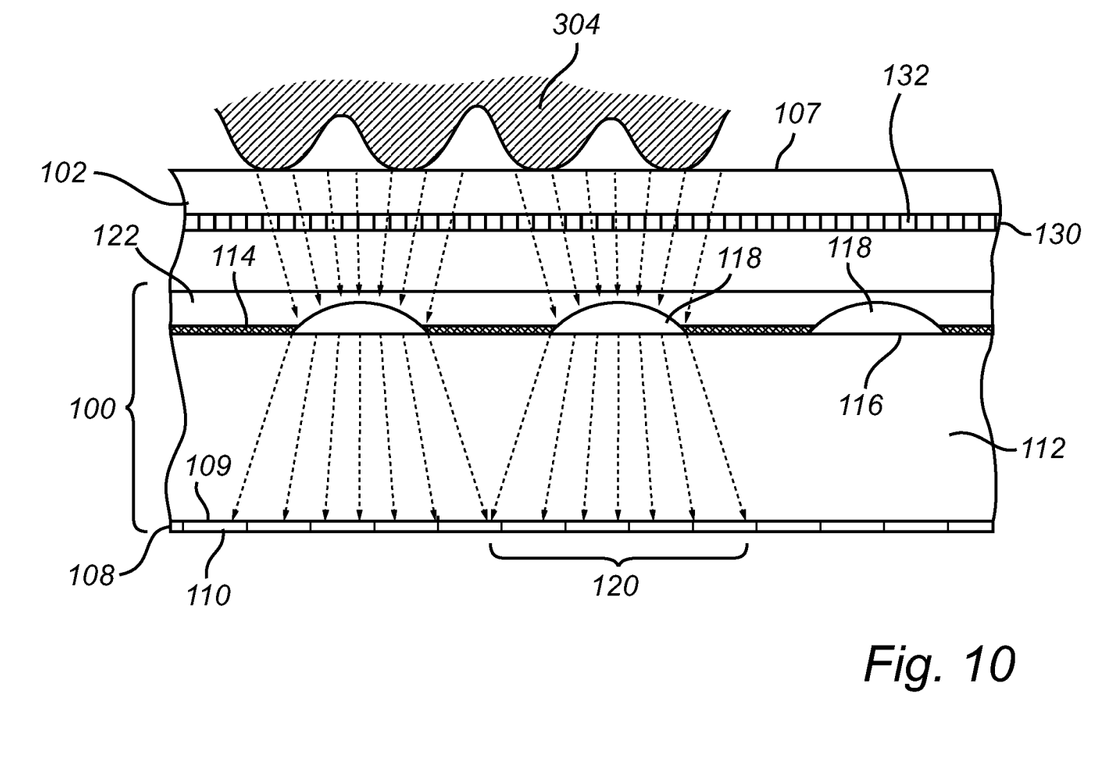
FIG. 10 schematically illustrates an optical fingerprint imaging arrangement according to an embodiment of the invention.

FIG. 10 schematically illustrates an optical fingerprint imaging arrangement 100 according to an embodiment of the invention. The optical fingerprint imaging arrangement 100 is here arranged under an at least partially transparent display panel 102. However, the optical fingerprint imaging arrangement 100 may be arranged under any cover structure which is sufficiently transparent, as long as the image sensor receives a sufficient amount of light to capture an image of a biometric object in contact with the outer surface of the cover structure, such as a fingerprint or a palm print. In the following, an optical fingerprint imaging arrangement 100 configured to capture an image of a finger 304 in contact with an outer surface 107 of the display panel 102 is described.

The optical fingerprint imaging arrangement 100 comprises an image sensor 108 comprising a photodetector pixel array 109, where each pixel 110 is an individually controllable photodetector arranged to detect an amount of incoming light and to generate an electric signal indicative of the light received by the detector. The image sensor 108 may be any suitable type of image sensor, such as a CMOS or CCD sensor connected to associated control circuitry. However, the image sensor 108 may in some implementations be a thin-film transistor (TFT) based image sensor which provides a cost-efficient solution. The operation and control of such an image sensor can be assumed to be known and will not be discussed herein.

The optical fingerprint imaging arrangement 100 further optionally comprises a transparent substrate 112 arranged to cover the image sensor 108, and an opaque layer 114 covering an upper surface of the transparent substrate 112. The opaque layer 114 further comprises a plurality of separate openings 116 arranged at a distance from each other.

The optical fingerprint imaging arrangement comprises an array of microlenses 118 each arranged in a respective opening 116 of the optional opaque layer 114 and in the same plane as the opaque layer 114. Moreover, the microlens 118 has the same size and shape as the opening 116 to prevent any stray light which has not passed through the microlens 118 from reaching the image sensor 108.

Each microlens 118 is configured to redirect light through the transparent substrate 112 and onto a subarray 120 of pixels in the photodetector pixel array 109. The subarrays 120 are here defined as arrays of pixels which receive light from only one microlens 118. It should further be noted that the microlenses 118 and display pixels are not drawn to scale. The microlens 118 is shown to receive light reflected by the finger 104 which has propagated through the display panel 102 before reaching the microlens 118 and the light received by the microlens 118 is focused onto the image sensor 108. The sub-arrays 120 of pixels receiving light from the microlenses 118 are preferably non-overlapping with adjacent subarrays receiving light from neighboring microlenses.

Moreover, the transparent display panel 102 comprises a color controllable light source 130, e.g. the color controllable light source 900 shown in FIG. 9, comprising individually controllable light emitting pixels 132. For acquiring an image of e.g. a fingerprint or palmprint, the color controllable light source 130 may emit light that is reflected by the finger 104 and detected by the pixels of the image sensor 110.

There are suitable openings or optical paths past the color controllable light source 130 so that the light beams being transmitted from the finger 104 to reach the image sensor 108.

In other possible implementations a color controllable light source may be arranged on the side of the transparent panel, i.e. next to the transparent panel. In such case light guides or a cover glass are configured to guide light from the color controllable light source to the image sensor area for the detection of a fingerprint.

The optical fingerprint imaging arrangement 100 further comprises an intermediate layer 122 located between the opaque layer 114 and the display panel 102. The intermediate layer 122 may for example comprise an adhesive layer used to attach the display panel 102 to the imaging device 100, and a refractive index of the intermediate layer 122 is different from a refractive index of the microlens 118. The intermediate layer comprises an air gap between the transparent display panel and the microlenses 118.

Furthermore, the intermediate layer 122 may also comprise an antireflection coating, an optical filter (e.g. infrared filter) and/or a polarizing filter, which are not illustrated separately herein. It is in general preferable that the refractive index of the microlens 118 is as high as possible and that it is different from the refractive index of any adjacent material above or below the microlens 118.

In some possible implementations the array of microlenses may be replaced by an array of collimators. In further possible implementations, the light guiding elements are comprised of an array of coded aperture elements. Coded aperture imaging is based on the principle of blocking the incoming light in a known pattern so that a coded shadow is cast upon the image sensor. The properties of the originally emitted light, i.e. the light reaching the coded aperture, can then be mathematically reconstructed from this shadow image.

The optical fingerprint imaging arrangement 100 is configured to apply the inventive concept described herein.

Accordingly, optical fingerprint imaging arrangement 100 is controllable to capture at least two images of the object while the object is illuminated with light of at least one distinguishable color by a color controllable light source 130, wherein the images are captured for different applied forces by the object on the transparent display panel 102.

Biometric authentication is performed at least partly based on at least one relationship between the at least two images, and is related to a difference in pixel intensity from pixels in the photodetector pixel array arranged to detect light of the distinguishable color. The biometric authentication may be performed by a control unit comprised in the optical fingerprint imaging arrangement 100 or a separate control unit comprised in the electric device where the optical fingerprint imaging arrangement 100 is installed.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the optical fingerprint imaging arrangement.

Even though the invention has been described with reference to specific exemplifying embodiments thereof, many different alterations, modifications and the like will become apparent for those skilled in the art. Also, it should be noted that parts of the imaging device may be omitted, interchanged or arranged in various ways, the imaging device yet being able to perform the functionality of the present invention.

Further, the relationships partly used for biometric authentication disclosed herein are shown for example purposes and should be construed as limiting the scope of the appended claims. Based on the inventive concept of comparing the difference in pixel intensities between pixels arranged to detect light of a distinguishable color to thereby detect a difference in response caused by properties in biological material, it is possible to form various ratios and differentials for evaluating the liveness of an object.

The microlenses are herein illustrated as plano-convex lenses having the flat surface orientated towards the transparent substrate. It is also possible to use other lens configurations and shapes. A plano-convex lens may for example be arranged with the flat surface towards the display panel, and in one embodiment the lens may be attached to a bottom surface of the display panel even though the imaging performance may be degraded compared to the reverse orientation of the microlens. It is also possible to use other types of lenses such as convex lenses. An advantage of using a plano-convex lens is the ease of manufacturing and assembly provided by a lens having a flat surface.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An optical fingerprint imaging arrangement configured to be arranged under an at least partially transparent display panel and configured to capture an image of an object located on an opposite side of the transparent display panel, the optical fingerprint imaging arrangement comprising:
   an image sensor comprising a photodetector pixel array;
   wherein the optical fingerprint imaging arrangement is configured to:
      capture at least two images of the object while the object is illuminated with light of at least one distinguishable color by a color controllable light source, the at least one distinguishable color being the same distinguishable color for at least two of the images, wherein the images are captured for different applied forces by the object on the transparent display panel; and
      wherein biometric authentication is performed at least partly based on at least one relationship between the at least two images related to a difference in pixel intensity from pixels in the photodetector pixel array arranged to detect light reflected from the object for the same distinguishable color at different applied forces by the object.

2. The optical fingerprint imaging arrangement according to claim 1, configured to estimate the applied forces based on the captured images.

3. The optical fingerprint imaging arrangement according to claim 1, comprising a force sensor for measuring the applied forces.

4. The optical fingerprint imaging arrangement according to claim 1, wherein the color controllable light source comprises a set of color controllable light units arranged in an array.

5. The optical fingerprint imaging arrangement according to claim 4, wherein the color controllable light source and the image sensor are arranged such that the pixels in the photodetector pixel array arranged to detect light of the distinguishable color primarily receives light emitted by color controllable light units configured to emit light of the distinguishable color.

6. The optical fingerprint imaging arrangement according to claim 4, wherein the pixels in the photodetector pixel array arranged to detect light of the distinguishable color are arranged directly under the color controllable light units configured to emit light of the distinguishable color.

7. The optical fingerprint imaging arrangement according to claim 1, wherein the color controllable light source is included in a display.

8. An electronic device comprising:
   a transparent display panel;
   the optical fingerprint imaging arrangement according to claim 1, and
   processing circuitry configured to:
   receive a signal from the optical fingerprint imaging arrangement indicative of a fingerprint of a finger touching the transparent display panel,
   perform a fingerprint authentication procedure based on the detected fingerprint.

9. A method for biometric authentication of a user of an electronic device comprising an optical fingerprint sensor arranged under an at least partially transparent display panel and configured to capture an image of an object located on an opposite side of the transparent display panel, the method comprises the steps of:
   illuminating the object with light of at least one distinguishable color;
   capturing at least two images of the object with an image sensor comprising a photodetector pixel array while illuminating the object with the light of at least one distinguishable color being the same distinguishable color for at least two of the images, wherein the images are captured for different applied forces by the object on the transparent display panel; and
   performing biometric authentication at least partly based on at least one relationship between the at least two images, the at least one relationship being related to a difference in pixel intensity from pixels in the photodetector pixel array arranged to detect light reflected from the object for the same distinguishable color at different applied forces by the object.

10. The method according to claim 9, wherein the object is illuminated with light of at least two distinguishable colors,
   wherein the captured images comprise images at the different applied forces for each of the at least two distinguishable colors,
   wherein the at least one relationship comprises, for each of the at least two distinguishable colors, a difference in pixel intensity from pixels arranged to detect light of the respective distinguishable color.

11. The method according to claim 10, wherein the object is simultaneously illuminated with light of the at least two distinguishable colors from spatially separated illumination zones.

12. The method according to claim 9, wherein the at least two images are sub-images of a captured image, wherein the different applied forces are caused by a spatial variation of the applied force by the object on the transparent display panel when the sub-images are being captured.

13. The method according to claim 9, wherein the at least two images are sequentially captured images, wherein the different applied forces are temporally separated.

14. The method according to claim 13, wherein the object is sequentially illuminated with light of at least two distinguishable colors,
wherein the captured images comprise images at the different applied forces for each of the at least two distinguishable colors,
wherein the at least one relationship comprises, for each of the at least two distinguishable colors, a difference in pixel intensity from pixels arranged to detect light of each distinguishable color.

15. The method according to claim 9, wherein when the object is illuminated with light of at least two distinguishable colors, the at least one relationship comprises a difference between a first ratio being a ratio between pixel intensities detected for two different distinguishable colors at a first force, and a second ratio being a ratio between pixel intensities detected for the two different distinguishable colors at a second force.

16. The method according to claim 9, comprising:
estimating the applied forces, wherein the at least one relationship comprises a relationship between the estimated forces related to different captured images.

17. The method according to claim 9, wherein the at least one relationship comprises a difference in applied force between two captured images, and a difference in pixel intensity at least one distinguishable color between the two captured images.

18. The method according to claim 9, wherein the light of at least one or two distinguishable colors is provided by a color controllable light source comprised in the electronic device.

19. The method according to claim 9, wherein the spectral bands of the light of distinguishable colors are at least partly separated.

20. The method according to claim 19, wherein the spectral bands include at least one of blue light, and red light, and green light.

* * * * *